July 14, 1953  A. A. MILLER  2,645,125
LIQUID LEVEL INDICATING INSTRUMENT
Filed Feb. 13, 1950

INVENTOR.
Alfred A. Miller
BY
Harry P. Canfield
ATTORNEY

Patented July 14, 1953

2,645,125

UNITED STATES PATENT OFFICE 2,645,125

LIQUID LEVEL INDICATING INSTRUMENT

Alfred A. Miller, Cleveland, Ohio

Application February 13, 1950, Serial No. 143,933

4 Claims. (Cl. 73—290)

This invention relates to instruments for indicating the quantity or level of liquid in a tank or like container.

In the preferred embodiment of the invention, it is actuated by the application of vacuum thereto, and therefore is particularly applicable to indicate the level of oil in the crank case of an automotive engine, inasmuch as vacuum is available at the engine; and will for this reason be described herein as applied to that use.

The invention itself is set forth in the appended claims; but in general comprises a collapsible chamber partly submerged in the oil of the engine crank case and in which oil is trapped at the same level as that in the crank case; a mechanism operable by vacuum to collapse the chamber, more or less determined by different levels of oil in it; a gage actuated variably by different degrees of collapse of the chamber and indicating oil levels; and an operator's control for applying vacuum to operate the mechanism.

The objects of the invention are:

To provide an improved instrument of the class referred to;

To provide an instrument of the class referred to having an improved mode of operation;

To provide a liquid level indicating instrument of the class referred to applicable to an automotive vehicle, the parts of which are in a static state and not subjected to the wear and tear of continuous operation, and which is rendered operative by the vehicle operator only momentarily when it is desired to take a reading of the oil level.

Other objects will be apparent to those skilled in the art to which the invention appertains.

The invention is fully disclosed in the following description taken in connection with the accompanying drawing, in which:

Fig. 4 is a view illustrating a modification.

Figures 1, 2:
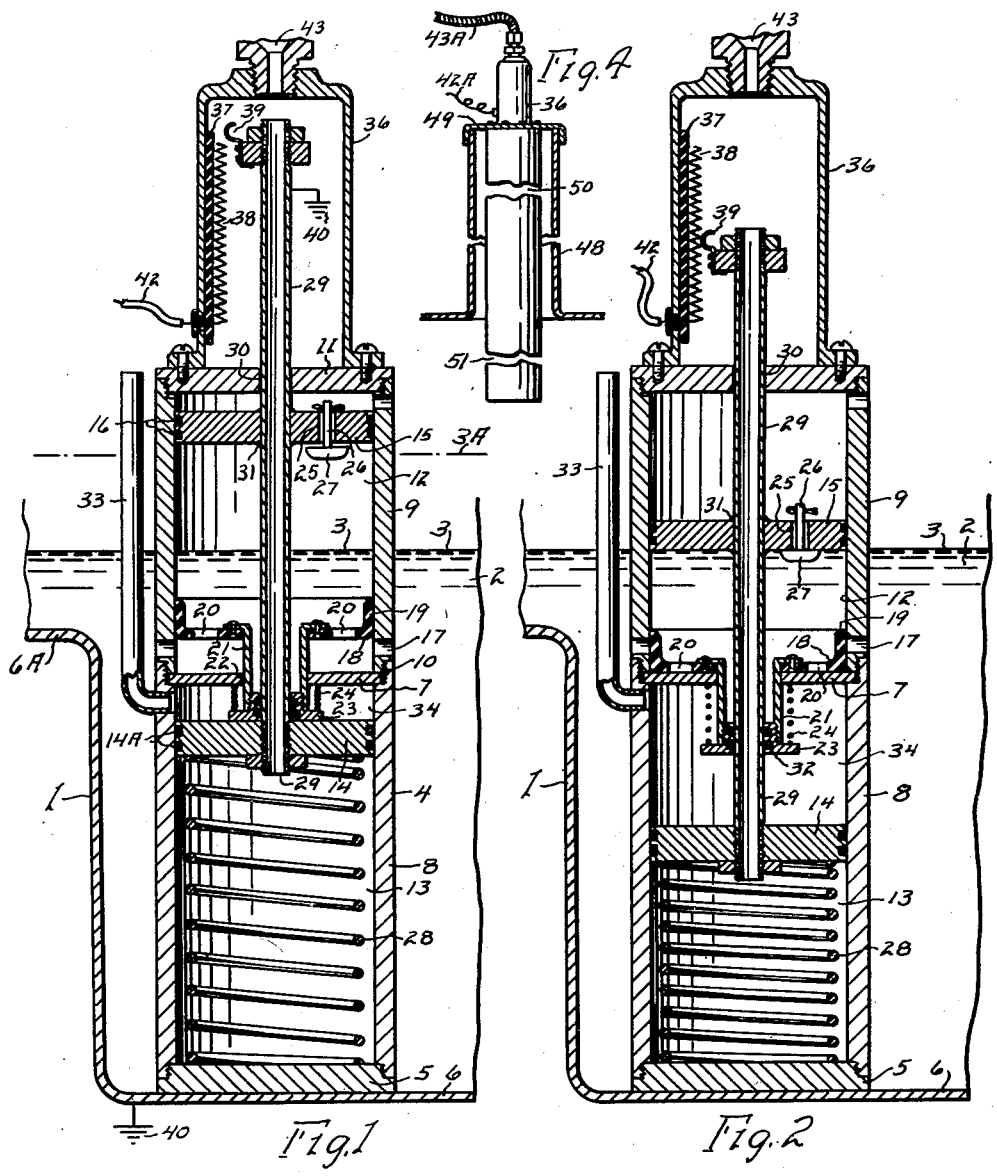
Fig. 1 is a longitudinal sectional view of an instrument embodying the invention with the parts in normal condition.
Fig. 2 is a view similar to Fig. 1 with the parts in operated condition.

Referring to the drawing, there is shown at 1 a fragment of a container containing liquid 2, and in the case of an internal combustion engine, the container 1 would be the engine crank case and the liquid would be oil. The level of the oil to be indicated is at 3.

At 4 is shown generally an upright tubular housing closed at its lower end by a wall 5. For reasons that will appear the housing will have a fixed position with relation to the oil level 3 and this may be effected by supporting the housing 4 in any suitable manner and for convenience it has been illustrated as resting on a bottom wall 6 of the container.

The housing 4 has a tranverse partition 7 which may be provided by making the housing 4 in two parts 8—9 screwed together as at 10 with the partition 7 between them.

The upper housing part 9 has a top cover wall 11 mounted thereon in any suitable manner.

There is thus provided an upper chamber 12 above the partition 7 and a lower chamber 13 below it.

In the lower chamber 13 is a piston 14 sealed upon the chamber wall by sealing rings 14A.

In the upper chamber 12 is a piston 15 similarly sealed by rings 16.

The upper chamber 12 at a lower part thereof near the partition 7 has ports 17 through the chamber wall communicating with the oil outside the housing, shown in Fig. 1 in the normal position of the parts.

A cup-shaped valve 18 of leather or like yieldable material having a valve skirt 19 fitting the inside wall of the chamber 12 like a piston is, as in Fig. 1, normally above the ports 17 and has openings 20 therethrough. By this arrangement, oil from outside the chamber may flow through the ports 17 and openings 20, and rise to the same level 3 inside the chamber 12 as shown in Fig. 1.

A tubular thimble 21 is secured at its upper end to the valve 18 and extends downwardly freely through an opening 22 in the partition 7 and has secured thereto a flanged head 23. A valve spring 24 surrounds the thimble and abuts oppositely upon the partition 7 and upon the head 23 and when free to do so, as will be described, will move the valve 18 downwardly and close the ports 17 by the valve skirt 19 as in the position of Fig. 2.

The piston 15 in the upper chamber 12 has a pressure equalizing port 25 therethrough in which is loosely supported a float valve 26 having a float head 27 which as will be explained, may rise and close the port.

In the lower chamber 13 is a compression spring 28 abutting oppositely upon the chamber bottom 5 and the piston 14.

A vacuum tube 29 extends axially downwardly through an opening 30 in the top wall 11, passes through the piston 15 and is secured thereto as by welding at 31, passes down through the thimble 21 and through the thimble head 23 and through the piston 14, being secured to the piston 14 by being screwed into it, and opens into the chamber 13, and is sealed upon the head 23 by sealing rings 32.

A pressure equalizing tube 33 communicates with the space 34 between the partition 7 and the piston 14 and extends upwardly to a point above the oil level 3 where it is always subjected to atmospheric pressure.

With the parts thus for described, and with reference to Fig. 1, the spring 28 holds the piston 14 normally in an upper position and by engagement with the head 23 holds it raised, compressing the valve spring 24 and holding the valve 18 in the position to keep the ports 17 open, and holds the piston 15 in an upper position near the top of the chamber 12.

Means to be described is provided to subject the open upper end of the tube 29 to vacuum. Vacuum is then communicated through the tube to the chamber 13, and since atmospheric pressure is always provided in the space 34, the vacuum pulls the piston 14 and tube 29 downwardly. This releases the thimble head 23 and allows the spring 24 to move the valve 18 to close the valve ports 17 as in Fig. 2.

Continued movement of the piston 14 and tube 29 downwardly, pulls the piston 15 downwardly.

Finally, with downward movement of the piston 15, the float head 27 contacts the surface of the oil at the level 3 and closes the port 25 and the oil in the chamber 12 is trapped therein and put under compression and further downward movement is thereby stopped.

The trapped oil is prevented from escaping downwardly through the inside of the thimble 21 and around the tube 29 by the seal rings 32, and from escaping downwardly around the outside of the thimble 21 through the partition 7 by the valve 18.

The parts are then in the position of Fig. 2.

In operation therefore, whenever vacuum is applied to the tube 29, the tube itself moves downward to a stopped position corresponding to the level of the oil as at 3.

Movement of the tube as described is utilized to actuate an oil level indicating instrument 35 by the means shown in Fig. 3 and Fig. 1, as follows.

The instrument 35 is preferably of the electrically actuated type calibrated to indicate oil level at points on a scale between high level and low level, in accordance with different degrees of energization. The gage can therefore be of a simple ammeter type.

Upon the top of the chamber head 11 is sealedly mounted, with respect to outside atmospheric pressure, a rheostat housing 36 in the form of an inverted cup. Inside of it and mounted on an insulator 37 is a resistor 38 (shown diagrammatically to simplify the drawing).

The upper end of the tube 29 extends into the housing 36, and carries a spring contact finger 39 arranged to make sliding contact on the resistor 38 as the tube moves downwardly. The tube is grounded as indicated at 40, the ground being actually effected as will be understood by metal to metal contact of the tube 29 through the device to the container wall 1.

Figure 3:
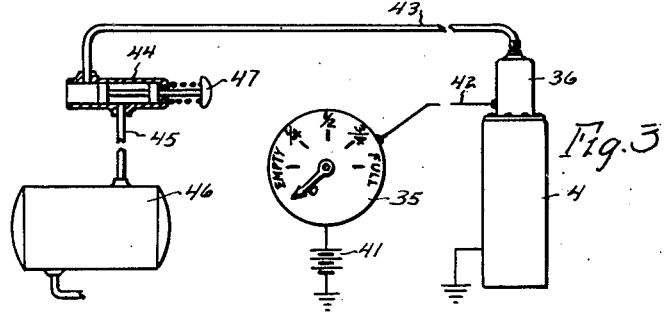
Fig. 3 is a diagrammatic view illustrating a system of operator's control of the instrument and an indicating gage.

Current from a battery 41, Fig. 3, flows through the instrument and by wire 42 to the resistor and through the contact finger 39 to ground; and the amount of current will be determined by the stopped position of the tube 29 and the corresponding stopped position of the finger 39 on the resistor 38.

To supply the vacuum for said purposes, a pipe 43, Figs. 1 and 3, leads from the interior of the cup 36 through a valve 44 to a pipe 45 and thence to a vacuum tank 46 in which vacuum may be produced by the engine in a well known manner.

The valve 44 is a manual valve, which may be of any well known construction for the purposes here being shown diagrammatically, and as comprising a push button 47 which when depressed effects said communication of vacuum from the tank 46 and pipe 45 to the pipe 43.

When the push button 47 is released and in the position shown in Fig. 3, it cuts off the pipe 45 and allows atmospheric air to enter the pipe 43, housing 36, pipe 29, and chamber 13.

The spring 28 then restores the parts to the normal condition of Fig. 1 for another operation.

The gage 35 and push button valve 44—47 are preferably mounted on the instrument panel of the vehicle for obvious reasons.

In Fig. 4 is illustrated another type of installation of the device. Here the tubular housing designated generally as 4 in Figs. 1 and 2 is indicated at 50—51; and is inserted down into the oil filling stem 48 of an engine; and has a flange 49 on the housing 36 to support it in predetermined position on the end of the stem; and the pipe, here 43A, and wire, here 42A, are flexible, so that the device may be removed for pouring oil into the stem.

The longitudinal positions and dimensions of the chambers 12 and 13 within the housing 50—51, are not shown, this being left to choice and design as indicated by breaking away parts at 50—51, but it will be understood from the foregoing description that the chamber 12 will be generally at the level of oil in the crank case to which the stem is connected. The device thus takes the place of the usual rod in the stem for indicating oil level by the oil adhering to it when withdrawn and observed.

As will be apparent, the principle of the invention is embodied in the expansible and contractable chamber 12 in which oil is first trapped at the same level as that in the engine crankcase, and a wall 15 of the chamber being movable down to the level of the oil and stopped thereat; and the variable stopped position of the wall utilized to variably energize the electric gage, the chamber wall being moved by mechanism actuated by the operator at the time of reading the gage.

The invention therefore is not limited to the exact mechanism illustrated and described for moving the wall 15, but is comprehensive of all modifications, changes and mechanical equivalents that come within the scope of the appended claims.

Also, as indicating the scope of the invention as set forth in the claims, it is to be understood that when, as in the illustrative disclosure hereof, the oil level to be indicated is that in an engine crankcase, the permissible range of level will be small, of the order of one inch, for example, and between the low level 3 and a top level thereabove. The main body of oil below the level 3 may not in practice be as deep as that illustrated, but by showing it deep the drawing illustrates also the use of the invention to indicate levels from that of a full container to that of an empty container, in which latter case the wall 6 may be considered as the bottom of a sump in the container to receive the lower part of the device. It will be understood, of course, that the longitudinal lengths of the chambers 12 and 13 may be increased to adapt the device to indicate greater ranges of level.

Also, as shown in the drawing, the cup form housing 36 communicates, through the unsealed opening 30 and through the valve port 25, with the chamber 12 both above and below the piston 15, whereby the force of the vacuum on the piston 15 is balanced. It is apparent therefore, that, within the scope of the invention, the housing 36 is in effect a continuation of the upper housing part 9; but has been shown as made separated and attached thereto, as a convenient way to provide and mount a wall enclosed rheostat 38—39.

I claim:

1. An instrument for indicating the level of liquid in a container, comprising: an elongated tubular housing for projection downwardly into liquid in the container, and having an upright position of use and having an intermediate transverse partition therein, providing an upper and a lower piston chamber; upper and lower pistons in the chambers respectively; the lower chamber being closed and being contractible and expansible upon movements of the lower piston therein; a port through the wall of the upper chamber communicating with liquid in the container adjacent to the partition; a piston valve in the upper chamber movable to open and close the port; an upper housing above the upper chamber; a tube open at both ends extending through the partition and through the piston valve and through both pistons and connected to both pistons, and sealed upon the piston valve and at its lower end opening into the lower chamber and its upper end opening into the housing; a spring in the lower chamber normally holding the pistons and tube in an upper position; an abutment on the piston valve extending through the partition and engaged by the lower piston by which the piston valve is normally held in port open position; a valve spring tending to move the abutment to move the piston valve to close the port; means for introducing vacuum into the upper housing and thence through the tube to the lower chamber to move the lower piston downwardly to cause it to disengage the abutment, to render the valve spring effective to move the piston valve to port closing position and to cause the lower piston to communicate downward movement to the upper piston and the tube connected therewith; an escape port through the upper piston; a float valve for closing the escape port having a float on the underside of the upper piston; an electric controller in the upper housing operated by movement of the tube therein; and circuit connections from the controller through the wall of the upper housing to an electric indicating gage.

2. An instrument for indicating liquid levels in a container, comprising an elongated tubular housing for projection downwardly into liquid in the container, and having an upright position of use; an upper and a lower piston and cylinder in the housing; a walled casing communicating with the upper cylinder above its piston; a tube opening at one end into the casing, and connected to both pistons and opening into the lower cylinder through the lower piston; a piston spring normally holding the tube and pistons in an upper position; conduit means connected to the casing and adapted to be connected to a vacuum source; operable means controlling the conduit means operable by an operator to communicate vacuum to the casing, and thence through the tube to the lower cylinder, and alternately operable to interrupt said vacuum communication and substitute atmospheric pressure communication to cause the piston spring to be overcome and to effect downward movement of the pistons and tube upon said communication of vacuum, and alternately to allow the spring to restore them upwardly upon communication of atmospheric pressure; a valve port communicating between the liquid in the container and the upper cylinder below its piston to cause liquid in the upper cylinder to be at the level of liquid in the container as the latter varies; a valve for the valve port and valve spring means tending to move the valve to close the port; means communicating movement of the pistons and tube to the valve to move the valve to port-open position when the pistons and tube are in their upper positions and to allow the valve spring means to close the valve when the pistons and tube are moved downwardly from their upper positions; a piston port through the upper piston through which gaseous contents of the upper cylinder between the upper piston and the liquid level under it may flow, upon downward movement of the upper piston; a valve operable automatically to close the piston port upon downward movement of the upper piston to the level of liquid in the upper cylinder to thereby stop downward movement of the pistons and tube; a gage for indicating liquid levels; and gage actuating means in the casing responsive to different stopped positions of the pistons and tube to indicate corresponding liquid levels.

3. An instrument for indicating liquid levels in a container, comprising an elongated tubular housing for projection downwardly into liquid in the container, and having an upright position of use; an upper and a lower piston and cylinder in the housing; a walled casing communicating with the upper cylinder above its piston; a tube opening at one end into the casing, and connected to both pistons and opening into the lower cylinder through the lower piston; a piston spring normally holding the tube and pistons in an upper position; conduit means connected to the casing and adapted to be connected to a vacuum source; means controlling the conduit means operable by an operator to communicate vacuum to the casing, and thence through the tube to the lower cylinder, and alternately operable to interrupt said vacuum communication and substitute atmospheric pressure communication to cause the piston spring to be overcome and to effect downward movement of the pistons and tube upon said communication of vacuum, and to allow the spring alternately to restore them upwardly upon communication of atmospheric pressure; a valve port communicating between the liquid in the container and the upper cylinder below its piston to be at the level of liquid in the container as the latter varies; a valve for the valve port and valve spring means tending to move the valve to close the port; means communicating movement of the pistons and tube to the valve to move the valve to port-open position when the pistons and tube are in their upper positions and to allow the valve spring means to close the valve when the pistons and tube are moved downwardly from their upper positions; a piston port through the upper piston through which gaseous contents of the upper cylinder between the upper piston and the liquid level under it may flow, upon downward movement of the upper piston; a valve operable automatically to close the piston port upon downward movement of the upper piston to the level of liquid in the upper cylinder to thereby stop downward movement of the pistons and tube; an electric controller in the casing operated by movement of the tube therein; and circuit connections from the controller through the wall of the casing to an electric indicating gage.

4. An instrument for indicating levels of liquid in a container, comprising: a housing having a first walled chamber; a communication between the chamber interior and the liquid in the container for establishing a liquid level in the chamber corresponding to that in the container; the first chamber having a first wall above the liquid level in it which is movable downwardly toward the liquid level; normally open valve means controlling the said communication; a second walled chamber in the housing having a second wall movable to expand and contract the chamber; a spring normally holding the second wall in chamber expanded position; a source of vacuum, and an operator's control to communicate vacuum to the second chamber to effect movement of the second wall against the force of the spring; mechanism actuable by said movement of the second wall to operate the valve means to cut off said communication and trap liquid in the first chamber, and to move the movable wall of the first chamber downwardly toward the liquid level in the chamber; an escape port for gaseous chamber contents between the first movable wall and the liquid level under it; an automatic valve to close the escape port when the first movable wall reaches the liquid level to stop movement of the first wall; gage actuating means connected to the first movable wall operated variably by different stopped positions thereof; and a gage responsive to the actuating means to indicate said stopped positions and calibrated in oil levels.

ALFRED A. MILLER.

References Cited in the file of this patent

UNITED STATES PATENTS

| Number | Name | Date |
|---|---|---|
| 1,081,843 | Larson | Dec. 16, 1913 |
| 1,526,376 | Rosenmund | Feb. 17, 1925 |
| 1,830,116 | Kruft | Nov. 3, 1931 |
| 2,239,613 | Martin | Apr. 22, 1941 |